(12) United States Patent
Hirakata

(10) Patent No.: US 10,690,967 B2
(45) Date of Patent: Jun. 23, 2020

(54) PLASTIC CELL AND METHOD FOR MANUFACTURING SAME

(71) Applicant: FUJIFILM Corporation, Tokyo (JP)

(72) Inventor: Junichi Hirakata, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 4 days.

(21) Appl. No.: 16/034,866

(22) Filed: Jul. 13, 2018

(65) Prior Publication Data

US 2018/0321528 A1    Nov. 8, 2018

Related U.S. Application Data

(63) Continuation of application No. PCT/JP2017/005819, filed on Feb. 17, 2017.

(30) Foreign Application Priority Data

Feb. 22, 2016   (JP) .................................. 2016-031314

(51) Int. Cl.
   *G02F 1/1339*   (2006.01)
   *G02F 1/1333*   (2006.01)
   *G02F 1/153*    (2006.01)

(52) U.S. Cl.
   CPC ...... *G02F 1/1339* (2013.01); *G02F 1/133305* (2013.01); *G02F 1/1533* (2013.01); *G02F 2001/13398* (2013.01)

(58) Field of Classification Search
   None
   See application file for complete search history.

(56) References Cited

U.S. PATENT DOCUMENTS

| 2015/0378196 A1 | 12/2015 | Ochiai et al. |
| 2017/0010490 A1 | 1/2017 | Li et al. |
| 2018/0292700 A1* | 10/2018 | Hirakata ................. B32B 7/02 |

FOREIGN PATENT DOCUMENTS

| CN | 104932154 A | 9/2015 |
| JP | 62-18523 A | 1/1987 |

(Continued)

OTHER PUBLICATIONS

International Preliminary Report on Patentability and Written Opinion of the International Searching Authority (forms PCT/IB/373, PCT/ISA/237 and PCT/IB/326), dated Sep. 7, 2018, for corresponding International Application No. PCT/JP2017/005819, with English translation of the WO.

(Continued)

*Primary Examiner* — Tracy M Dove
(74) *Attorney, Agent, or Firm* — Birch, Stewart, Kolasch & Birch, LLP

(57) ABSTRACT

An object of the present invention is to provide a plastic cell having a sealing part that does not lose a sealing property even in a case where a plastic substrate is deformed into a free shape with roughness or curved surfaces, and a method for manufacturing the same. The plastic cell of the present invention is a plastic cell including a first plastic substrate, a first transparent conductive layer, a fluid layer, a second transparent conductive layer, and a second plastic substrate, in this order, in which the plastic cell further includes a sealing part that seals the fluid layer by deformation of a part of the first plastic substrate or the second plastic substrate, and the sealing part is a sealing part having a region of a wavy line shape that satisfies Expression (1), $$P \le 40\,A \qquad (1)$$

in Expression (1), P represents a period of the wavy line shape, and A represents an amplitude of the wavy line shape.

4 Claims, 6 Drawing Sheets

(56) References Cited

FOREIGN PATENT DOCUMENTS

| JP | 11-249158 A | 9/1999 | | |
|---|---|---|---|---|
| JP | 2000-109028 A | 4/2000 | | |
| JP | 2009-104841 A | 5/2009 | | |
| JP | 2011-64976 A | 3/2011 | | |
| JP | 2016-11994 A | 1/2016 | | |
| WO | WO-2017104716 A1 * | 6/2017 | ............... | B32B 7/02 |
| WO | WO-2017142050 A1 * | 8/2017 | ............. | B32B 27/00 |

OTHER PUBLICATIONS

International Search Report (form PCT/ISA/210), dated May 9, 2017, for corresponding International Application No. PCT/JP2017/005819, with an English translation.

Japanese Office Action, dated Mar. 19, 2019, for corresponding Japanese Application No. 2018-501630.

* cited by examiner

PLASTIC CELL AND METHOD FOR MANUFACTURING SAME

CROSS-REFERENCE TO RELATED APPLICATIONS

This application is a Continuation of PCT International Application No. PCT/JP2017/005819 filed on Feb. 17, 2017, which claims priority under 35 U.S.C. § 119(a) to Japanese Patent Application No. 2016-031314 filed on Feb. 22, 2016. The above application is hereby expressly incorporated by reference, in its entirety, into the present application.

BACKGROUND OF THE INVENTION

1. Field of the Invention

The present invention relates to a plastic cell using a plastic substrate and a method for manufacturing the same.

2. Description of the Related Art

In recent years, liquid crystal display devices have evolved into various forms, and flexible displays which are light-weight and bendable have attracted attention. In liquid crystal cells used for such flexible displays, it is difficult to meet the requirements of being light-weight and bendable with a glass substrate which has been used in the related art. Thus, various types of plastic substrates have been studied as a substitute for the glass substrate.

Further, applications of a liquid crystal cell have spread to light control devices used for applications such as packaging, decoration, interior design, building materials, and vehicles. Also in such light control devices, it is desirable to use a liquid crystal cell which is light, has flexibility of being bendable, and further has a free shape with roughness and curved surfaces rather than a two-dimensional plane. Even in substrates for these applications, there is a need for practical use of a plastic substrate as a substitute for the glass substrate.

On the other hand, in a case of manufacturing a liquid crystal cell having flexibility, it is necessary that a sealing agent for sealing a liquid crystal compound in the liquid crystal cell also has flexibility.

As a sealing agent having such flexibility, for example, JP1987-18523A (JP-S62-18523A) discloses a sealing agent using an epoxy resin cured product to which flexibility has been imparted.

SUMMARY OF THE INVENTION

The present inventors studied the sealing agent described in JP1987-18523A (JP-S62-18523A). As a result, it is found that in a case where a plastic substrate having a roughness shape or a curved surface shape is used, there are some cases where a sealing property is lost.

Accordingly, an object of the present invention is to provide a plastic cell having a sealing part that does not lose a sealing property even in a case where a plastic substrate is deformed into a free shape with roughness or curved surfaces, and a method for manufacturing the same.

As a result of intensive studies, the present inventors have found that, with respect to a sealing method used for a plastic cell, by deforming (for example, performing a thermal fusion welding of) a part of plastic substrates disposed above and below the plastic cell to seal a fluid layer and providing a predetermined region of a wavy line shape in the sealing part, sealing properties of the plastic cell can be maintained even in a case where the plastic substrates are deformed into a free shape with roughness and curved surfaces.

That is, it has been found that the object can be achieved by the following configuration.

[1] A plastic cell comprising:
a first plastic substrate, a first transparent conductive layer, a fluid layer, a second transparent conductive layer, and a second plastic substrate, in this order,
in which the plastic cell further comprises a sealing part that seals the fluid layer by deformation of a part of the first plastic substrate or the second plastic substrate, and
the sealing part is a sealing part having a region of a wavy line shape that satisfies Expression (1), $$P \leq 40\,A \qquad (1)$$

in Expression (1), P represents a period of the wavy line shape, and A represents an amplitude of the wavy line shape.

[2] The plastic cell according to [1],
In which both the first plastic substrate and the second plastic substrate are elongated films, and
the plastic cell is in a roll form obtained by winding the elongated films in a longitudinal direction.

[3] The plastic cell according to [1], having a curved surface region.

[4] A method for manufacturing a plastic cell, comprising:
a step of heating the plastic cell according to [1] to 100° C. or higher and molding the plastic cell to have a curved surface region.

According to the present invention, it is possible to provide a plastic cell having a sealing part that does not lose a sealing property even in a case where a plastic substrate of the plastic cell is deformed into a free shape with roughness or curved surfaces by stretching or shrinkage, and a method for manufacturing the same.

DESCRIPTION OF THE PREFERRED EMBODIMENTS

Hereinafter, the present invention will be described in detail.

Descriptions of constituent elements described below are made based on representative embodiments of the present invention, but the present invention is not limited to such embodiments.

In the present specification, a numerical range expressed using "to" means a range including numerical values described before and after the preposition "to" as a lower limit value and an upper limit value.

Further, in the present specification, "cutting" includes "punching", "slicing", and the like.

<Plastic Cell>

The plastic cell of the present invention includes a first plastic substrate, a first transparent conductive layer, a fluid layer, a second transparent conductive layer, and a second plastic substrate, in this order.

Further, the plastic cell of the present invention includes a sealing part that seals the fluid layer by deformation of a part of the first plastic substrate or the second plastic substrate.

Furthermore, in the plastic cell of the present invention, the sealing part is a sealing part having a region of a wavy line shape that satisfies Expression (1).

Figure 1:
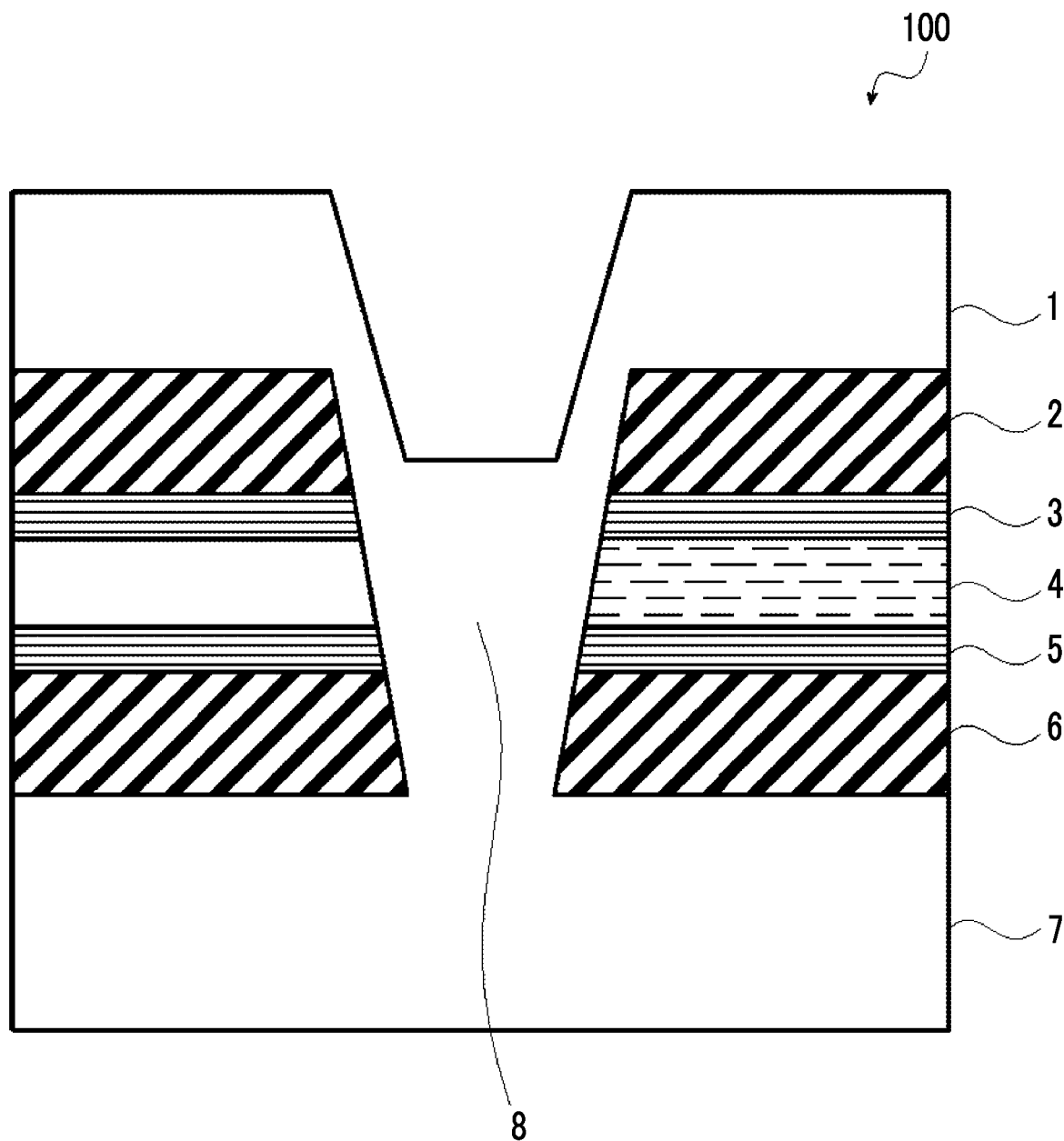
FIG. 1 is a schematic cross-sectional view showing an example of one embodiment of a plastic cell of the present invention.

FIG. 1 is a schematic cross-sectional view showing one embodiment of a plastic cell of the present invention.

As shown in FIG. 1, the plastic cell 100 of the present invention includes a first plastic substrate 1, a first transparent conductive layer 2, a fluid layer 4, a second transparent conductive layer 6, and a second plastic substrate 7, in this order. In the embodiments as shown in FIG. 1, an orientation layer 3 and an orientation layer 5 are disposed between the first transparent conductive layer 2 and the fluid layer 4 and between the second transparent conductive layer 6 and the fluid layer 4, respectively.

Further, as shown in FIG. 1, the plastic cell 100 of the present invention includes a sealing part 8 that seals the fluid layer 4 by deformation of a part of the first plastic substrate 1 or the second plastic substrate 7.

[Plastic Substrate]

Both the first plastic substrate and the second plastic substrate (hereinafter simply abbreviated as "plastic substrate" in a case where distinction is not particularly required) of the plastic cell of the present invention are a substrate used from the viewpoint of achieving a high degree of freedom in moldability.

In a case of manufacturing a plastic cell, since dimensional changes such as stretching and shrinkage occur locally, it is preferable to use a thermoplastic resin as the plastic substrate.

As the thermoplastic resin, a polymer resin which is excellent in optical transparency, mechanical strength, thermal stability, and the like is preferable.

Examples of the polymer included in the thermoplastic resin include polycarbonate-based polymers; polyester-based polymers such as polyethylene terephthalate (PET); acrylic polymers such as polymethyl methacrylate (PMMA); styrene-based polymers such as polystyrene and acrylonitrile-styrene copolymers (AS resins); and the like.

Further, polyolefins such as polyethylene and polypropylene; polyolefin-based polymers such as norbornene-based resins and ethylene-propylene copolymers; vinyl chloride-based polymers; amide-based polymers such as nylon and aromatic polyamide; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; epoxy-based polymers; cellulosic polymers typified by triacetyl cellulose; copolymers copolymerized with monomer units of these polymers; or the like can be mentioned.

Further, examples of the thermoplastic resin include polymers obtained by mixing two or more of the polymers exemplified above.

[Transparent Conductive Layer]

Both the first transparent conductive layer and the second transparent conductive layer (hereinafter simply abbreviated as "transparent conductive layer" in a case where distinction is not particularly required) of the plastic cell of the present invention are a layer having conductivity and disposed on the plastic substrate.

In the present invention, "having conductivity" means that a sheet resistance value is 0.1 $\Omega$/square to 10,000 $\Omega$/square, and generally also includes those called an electric resistance layer.

Further, in a case of being used as an electrode of a flexible display device or the like, the sheet resistance value is preferably low; specifically, it is preferably 300 $\Omega$/square or less, particularly preferably 200 $\Omega$/square or less, and most preferably 100 $\Omega$/square or less.

In the transparent conductive layer used in the present invention, "transparent" means that a transmittance is 60% or more and 99% or less.

The transmittance of the transparent conductive layer is preferably 75% or more, particularly preferably 80% or more, and most preferably 90% or more.

As materials that can be used for the transparent conductive layer used in the present invention, metal oxides (Indium Tin Oxide: ITO and the like), carbon nanotubes (Carbon Nanotube: CNT, Carbon Nanobud: CNB, and the like), graphene, polymer conductors (polyacetylene, polypyrrole, polyphenol, polyaniline, PEDOT/PSS, and the like), metal nanowires (silver nanowires, copper nanowires, and the like), metal mesh (silver mesh, copper mesh, and the like), and the like can be used.

Here, "PEDOT/PSS" means a polymer complex in which PEDOT (polymer of 3,4-ethylenedioxythiophene) and PSS (polymer of styrene sulfonic acid) coexist.

Further, a conductive layer of the metal mesh is preferably formed by dispersing conductive fine particles of silver, copper, or the like in a matrix rather than being formed only of a metal.

A metal oxide such as ITO is a ceramic material and has a problem that cracks are easily formed by a stretching action to remarkably increase the sheet resistance value in a case of being molded without utilizing shrinkage as in technologies of the related art. On the other hand, in the present invention, generation of cracks can be suppressed by utilizing shrinkage, and the problem of exhibiting a high sheet resistance value, which has been a problem in the related art, can be improved so that such material can be used as a transparent conductive layer.

A conductive layer in which particles such as metal mesh form, carbon nanotube form or metal nanowires are dispersed in a matrix can easily follow shrinkage of the plastic substrate by making a glass transition temperature (Tg) of the matrix equal to or lower than a shrinkage temperature of the plastic substrate and is preferable because such conductive layer can suppress generation of wrinkles and suppress increase of haze as compared with a conductive layer using a metal oxide and a polymer conductor.

[Orientation Layer]

In the plastic cell of the present invention, an orientation layer may be comprised between the transparent conductive layer provided on the plastic substrate and the fluid layer described later. In a preferred embodiment, the orientation layer is provided on the uppermost surface of each of the first plastic substrate and the second plastic substrate used for the plastic cell, and allows the plastic cell to have a function of orientating the fluid layer containing a liquid crystal compound.

In a case where no voltage is applied, the orientation layer used in the present invention may be an orientation layer for horizontally orientating the liquid crystal compound contained in the fluid layer or an orientation layer for vertically orientating the same.

Materials for the orientation layer and treatment methods thereof are not particularly limited, and it is possible to use various orientation layers such as an orientation layer using a polymer, an orientation layer obtained by being subjected to a silane coupling treatment, an orientation layer using a quaternary ammonium salt, an orientation layer obtained by depositing silicon oxide from an oblique direction, and an orientation layer utilizing photoisomerization. In addition, as a surface treatment for the orientation layer, a surface treatment performed by rubbing treatment, energy ray irradiation, photo-irradiation, or the like may be used.

The orientation layer using a polymer preferably includes any one of a layer using a polyamic acid or a polyimide; a layer using a modified or unmodified polyvinyl alcohol; a layer using a modified or unmodified polyacrylic acid; or a layer using a (meth)acrylic acid copolymer containing any one of a repeating unit represented by General Formula (I), a repeating unit represented by General Formula (II), or a repeating unit represented by General Formula (III).

Further, "(meth)acrylic acid" is a description representing acrylic acid or methacrylic acid.

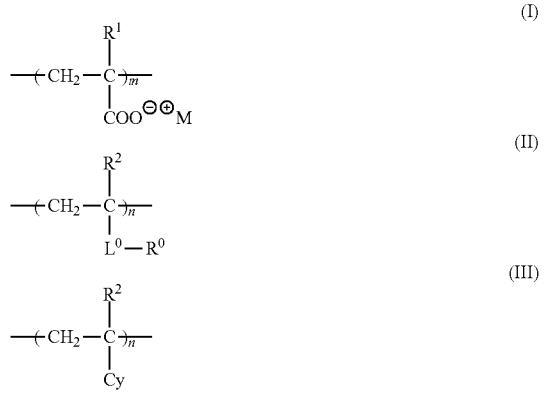

In General Formulas (I) to (III), $R^1$ and $R^2$ each independently represent a hydrogen atom, a halogen atom, or an alkyl group having 1 to 6 carbon atoms; M represents a proton, an alkali metal ion, or an ammonium ion; $L^0$ is a divalent linking group selected from the group consisting of —O—, —CO—, —NH—, —SO$_2$—, an alkylene group, an alkenylene group, an arylene group, and a combination thereof; $R^0$ is a hydrocarbon group having 10 to 100 carbon atoms or a fluorine atom-substituted hydrocarbon group having 1 to 100 carbon atoms; Cy is an alicyclic group, aromatic group, or heterocyclic group, particularly preferably, having a carbazole group; m is 10 to 99 mol %; and n is 1 to 90 mol %.

Among these, it is preferable to use an orientation layer containing any one of polyimide, compounds represented by General Formulas (I) to (III), and a silane coupling agent from the viewpoints of orientation capability, durability, insulation property, and costs; and it is particularly preferable to use an orientation layer containing any one of polyimide or compounds represented by General Formulas (I) to (III) and having a carbazole group.

Further, as the orientation layer, a photo-orientation layer capable of orientating a liquid crystal by irradiation with polarized and unpolarized ultraviolet (UV) light may be used.

[Fluid Layer]

The fluid layer of the plastic cell of the present invention is not particularly limited as long as it is a continuous body having fluidity other than gas and plasma fluid.

As a particularly preferred substance state, a liquid and a liquid crystal are preferable, and as the fluid layer, a liquid crystal layer formed by using a liquid crystal composition containing a liquid crystal compound is most preferable.

Here, in general, the liquid crystal compound can be classified into a rod-like type and a disk-like type depending on its shape. These types further have a low molecule type and a high molecule type, respectively. The high molecule generally refers to one having a degree of polymerization of 100 or more (Polymer Physics-Phase Transition Dynamics, by Masao Doi, p. 2, published by Iwanami Shoten, Publishers, 1992). In the present invention, any liquid crystal compound can be used. However, it is preferable to use a rod-like liquid crystal compound or a discotic liquid crystal compound (disk-like liquid crystal compound). Two or more rod-like liquid crystal compounds, two or more disk-like liquid crystal compounds, or a mixture of the rod-like liquid crystal compound and the disk-like liquid crystal compound may be used. In order to immobilize the above-described liquid crystal compound, it is more preferable to use a rod-like liquid crystal compound or disk-like liquid crystal compound having a polymerizable group to form the liquid crystal compound, and the liquid crystal compound still more preferably has two or more polymerizable groups in one molecule. In a case of using a mixture of two or more liquid crystal compounds, it is preferable that at least one liquid crystal compound has two or more polymerizable groups in one molecule.

The plastic cell of the present invention is preferably an embodiment in which the above-described fluid layer is a liquid crystal layer, that is, a liquid crystal cell.

Here, the liquid crystal cell means a liquid crystal cell used for liquid crystal display devices used for a thin television, a monitor, a notebook computer, a cellular phone, and the like, and a liquid crystal cell used for light control devices for changing intensity of light which is applied to interior design, building materials, vehicles, and the like. That is, the liquid crystal cell is a general term for devices that adjust a voltage to drive a liquid crystal composition having a polarizability such as a liquid crystal composition sealed between two substrates.

As a driving mode of the liquid crystal cell, various methods including in-plane-switching (IPS), vertical alignment (VA), twisted nematic (TN), and super twisted nematic (STN) can be used.

Further, inside the cell in the plastic cell of the present invention, colorant molecules and the like used for changing intensity of light in a light control element may be used in combination.

Further, depending on a configuration of the liquid crystal cell, a backlight member, a polarizing plate member, a member for controlling surface reflection, and the like may be used outside the liquid crystal cell by juxtaposition or bonding.

[Sealing Part]

The plastic cell of the present invention has a sealing part for sealing the above-described fluid layer.

Here, since the sealing part is formed by deformation of a part of the first plastic substrate or the second plastic substrate, it includes a part of the first plastic substrate or the second plastic substrate.

Further, it is preferable that the sealing part is a seal formed by performing a thermal fusion welding of plastic substrates to each other.

The sealing part of the plastic cell of the present invention has a region of a wavy line shape satisfying Expression (1).

$$P \leq 40\ A \quad (1)$$

In Expression (1), P represents a period of the wavy line shape, and A represents an amplitude of the wavy line shape.

Here, a sealing part "having a region of a wavy line shape satisfying Expression (1)" means that a figure of the sealing part (for example, reference numeral 8 in FIG. 2) projected on a plane parallel to the plastic substrate is a shape satisfying Expression (1).

In a case where the sealing part has a width, it is sufficient that a central portion thereof satisfies Expression (1).

Figure 3:
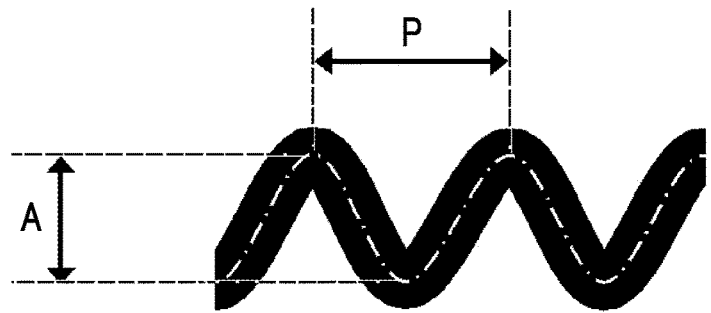
FIG. 3 is a schematic diagram showing an example of a region of a wavy line shape in the present invention.
Figure 4:
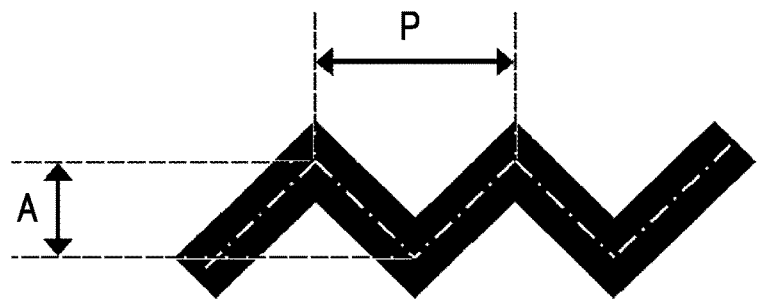
FIG. 4 is a schematic diagram showing another example of the region of a wavy line shape in the present invention.

Further, as shown in FIG. 3, the "wavy line shape" is not limited to a wavy line consisting only of a normal curved line such as a so-called sine wave, but as shown in FIG. 4, it includes a wavy line consisting of a plurality of straight lines such as a sawtooth wave or a wavy line including both straight and curved lines.

Figure 5:
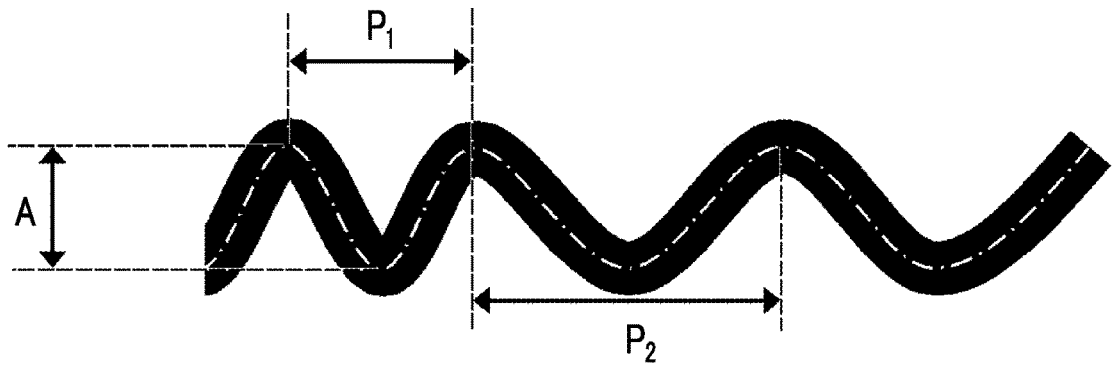
FIG. 5 is a schematic diagram showing still another example of the region of a wavy line shape in the present invention.

Further, as shown in FIG. 5, one or both of a period and an amplitude may be changed in the middle. In such a case, it is sufficient that at least one period is a wavy line satisfying Expression (1), and a region that does not satisfy Expression (1) may exist. For example, in a region of a wavy line shape shown in FIG. 5, as long as $P_1$ and A are in a relationship satisfying Expression (1), $P_2$ and A may or may not satisfy Expression (1).

In the present invention, it is preferable that all regions of the sealing part are regions of a wavy line shape satisfying Expression (1).

Figure 6:
FIG. 6 is a schematic diagram showing still another example of the region of a wavy line shape in the present invention.
Figure 7:
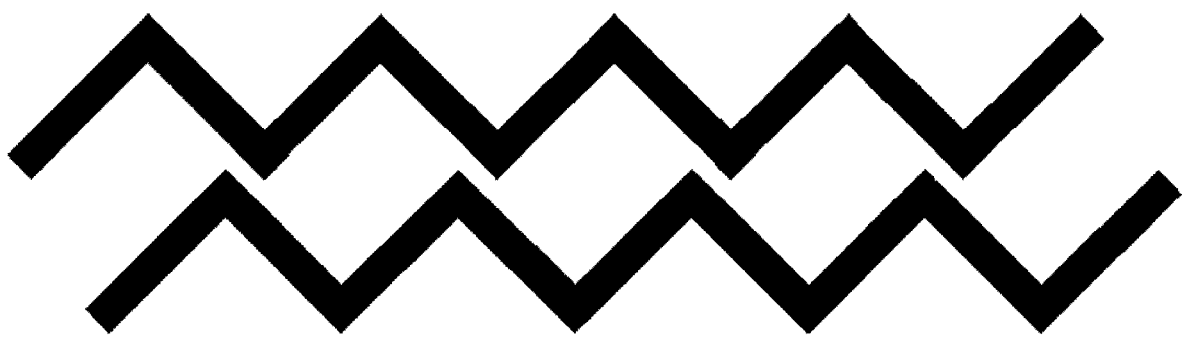
FIG. 7 is a schematic diagram showing still another example of the region of a wavy line shape in the present invention.
Figure 8:
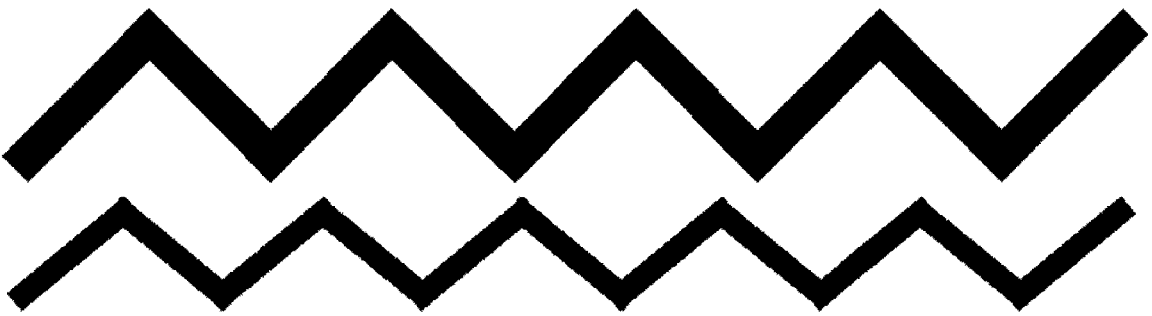
FIG. 8 is a schematic diagram showing still another example of the region of a wavy line shape in the present invention.
Figure 9:
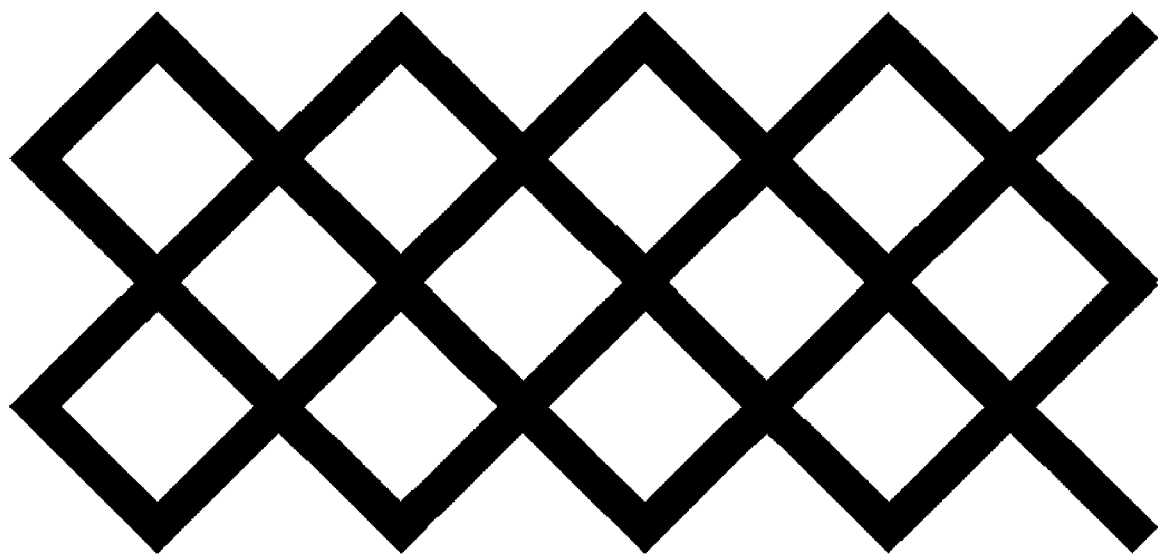
FIG. 9 is a schematic diagram showing still another example of the region of a wavy line shape in the present invention.

Further, the sealing part in the plastic cell of the present invention has a plurality of regions of a wavy line shape which are overlapping with each other as shown in FIG. 6, which are period-shifted and are overlapping with each other as shown in FIG. 7, or which satisfy Expression (1) but have different periods and amplitudes and are overlapping with each other as shown in FIG. 8. In addition, as shown in FIG. 9, a plurality of regions of a wavy line shape may overlap with each other to form a network-like sealing part.

In the plastic cell of the present invention, a planar shape may be a rectangular shape. The rectangular shape may be a square or an oblong, and there is no limitation on a size.

Further, in the plastic cell of the present invention, the planar shape may be a shape other than a rectangle. For example, the planar shape may be a circle, an ellipse, a triangle, a pentagon or higher polygon, or a free shape obtained by combination of a straight line and a curved line, or may be a shape that is hollow on the inside like a donut shape in a case where a periphery of the plastic cell is sealed.

Furthermore, in the plastic cell of the present invention, an elongated film can be used as the first plastic substrate and second plastic substrate. Thus, it is also possible to form the plastic cell and then wind it in a longitudinal direction into a roll form. This can contribute to packing, shipping, transportation, and the like of the plastic cell of the present invention.

On the other hand, the plastic cell of the present invention may have a curved surface region.

Here, the "curved surface region" may be a bent shape or a free shape partially including roughness, which does not lose a function of a plastic cell, for example, a display function or a dimming function.

Further, in a case where the plastic cell of the present invention is molded so as to have a curved surface region, molding may be performed by softening the plastic cell with a high-temperature treatment and, at the same time, pressing the plastic cell against a curved surface-shaped mold to be stretched or shrunk.

The above-mentioned high-temperature treatment is preferably 100° C. or higher, and more preferably is a temperature which is before and after a glass transition temperature of the plastic substrate used in the plastic cell of the present invention from the viewpoint of achieving uniform molding.

[Electrode]

In the plastic cell of the present invention, in order to apply a driving voltage, an electrode connected to the transparent conductive layer may be installed via a conductive material. For example, a method in which, for a conductive material exposed on a surface at a side opposite to the transparent conductive layer of the plastic substrate, a conductive material such as a silver paste, a conductive tape, or the like is used to connect to a lead terminal, or the like can be used.

[Method for Manufacturing Plastic Cell]

The method for manufacturing a plastic cell of the present invention (hereinafter also abbreviated as "manufacturing method of the present invention") is a method for manufacturing the plastic cell, including:

a step of disposing a first transparent conductive layer on a first elongated plastic substrate (hereinafter also abbreviated as "conductive layer disposing step 1");

a step of disposing a second transparent conductive layer on a second elongated plastic substrate (hereinafter also abbreviated as "conductive layer disposing step 2");

a step of disposing a fluid layer on the first transparent conductive layer (hereinafter also abbreviated as "fluid layer disposing step");

a step of bonding the first plastic substrate, on which the fluid layer and the first transparent conductive layer are disposed, and the second plastic substrate, on which the second transparent conductive layer is disposed, to each other by a roll-to-roll process, to produce an elongated laminate (hereinafter also abbreviated as "laminate producing step");

subsequent to production of the laminate, a step of performing a thermal fusion welding of the first plastic substrate and the second plastic substrate to each other, to seal the fluid layer in the longitudinal direction (hereinafter also abbreviated as "sealing step"); and a step of winding the laminate in a roll shape.

Hereinafter, the conductive layer disposing step 1 and the conductive layer disposing step 2 (hereinafter, simply abbreviated as "conductive layer disposing step" in a case where distinction is not particularly required), and the fluid layer disposing step, the laminate producing step, and the sealing step will be described in detail.

[Conductive Layer Disposing Step]

In the manufacturing method of the present invention, the conductive layer disposing step 1 is a step of disposing the first transparent conductive layer on the first elongated plastic substrate, and the conductive layer disposing step 2 is a step of disposing the second transparent conductive layer on the second elongated plastic substrate.

Here, the method of disposing the transparent conductive layer on the plastic substrate is not particularly limited, and the material usable for the transparent conductive layer described in the plastic cell of the present invention may, for example, be disposed by a method such as coating, vapor deposition, or printing.

[Fluid Layer Disposing Step]

In the manufacturing method of the present invention, the fluid layer disposing step is a step of disposing the fluid layer on the first transparent conductive layer.

Here, the method of disposing the fluid layer on the first transparent conductive layer is not particularly limited, and various known methods such as coating, dipping, and injection utilizing capillary phenomenon can be used.

[Laminate Producing Step]

In the manufacturing method of the present invention, the laminate producing step is a step of bonding the first plastic substrate, on which the first transparent conductive layer and the fluid layer are disposed, and the second plastic substrate, on which the second transparent conductive layer is disposed, to each other by a roll-to-roll process, to produce an elongated laminate.

Here, the method of performing the bonding by a roll-to-roll process is not particularly limited, and, for example, a method of passing the first plastic substrate, on which the first transparent conductive layer and the fluid layer are disposed, and the second plastic substrate, on which the second transparent conductive layer is disposed, between nip rolls to achieve bonding, or the like can be used.

[Sealing Step]

In the manufacturing method of the present invention, the sealing step is a step of performing a thermal fusion welding of the first plastic substrate and the second plastic substrate to each other, to seal the fluid layer in a longitudinal direction.

Here, the method of performing a thermal fusion welding is not particularly limited as long as a method of giving energy required for thermal fusion welding to a plastic substrate is used. Specifically, a method of bringing a high-temperature metal element into contact with the plastic substrate, a method of concentrating a COx laser to the plastic substrate, a method of applying ultrasonic waves to the plastic substrate, and the like.

EXAMPLES

Hereinafter, the present invention will be specifically described with reference to examples. However, the materials, reagents, substance amounts and proportions thereof, conditions, operations, and the like shown in the following examples can be appropriately changed within a scope that does not depart from the gist of the present invention. Accordingly, a scope of the present invention is not limited to the following examples.

Example 1

<Production of Transparent Conductive Layer>

A polycarbonate (PC-2151, thickness 250 μm) manufactured by Teijin Limited was biaxially stretched at 150° C., lengthwise to 30% and widthwise to 30%. Then, a transparent conductive layer was produced with Ag nanowire by a method described in Example 1 of US2013/0341074A, and a laminate in which a plastic substrate formed of the polycarbonate and the transparent conductive layer formed of Ag nanowire were laminated was produced.

<Production of Orientation Layer>

The laminate produced above was cut into one having a length of 6 cm and a width of 10 cm, and a polyamic acid orientation layer coating solution (JALS684, manufactured by JSR Corporation) as a liquid crystal orientating agent was coated thereon using a bar coater #1.6. Thereafter, the resulting laminate was dried at a film surface temperature of 80° C. for 3 minutes to produce an orientation layer 101. At this time, a film thickness of the orientation layer was 60 nm.

Two sets of laminates produced in this manner, in each of which the plastic substrate, the transparent conductive layer, and the orientation layer were laminated in this order, were prepared.

<Production of Spacer Layer>

A spacer layer dispersion liquid was produced by using the following formulation.

| Formulation of spacer layer dispersion liquid | |
|---|---|
| Bead spacer SP-208 (manufactured by Sekisui Chemical Co., Ltd.) | 100 parts by mass |
| Methyl isobutyl ketone | amount to give solid content of 0.2% |

The produced spacer layer dispersion liquid was coated on each of the two sets of the laminates, in which the liquid crystal orientation layer was laminated, using an applicator with a clearance setting of 100 μm.

Thereafter, the laminate was heated so that a film surface temperature thereof was 60° C., and dried for 1 minute to produce two sets of laminates having a spacer layer.

<Production of Liquid Crystal Cell>

A liquid crystal layer composition was produced by using the following formulation.

| Liquid crystal layer composition | |
|---|---|
| ZLI 2806 (manufactured by Merck KGaA) | 100 parts by mass |
| Cholesteric nonanate (manufactured by Tokyo Chemical Industry Co., Ltd.) | 1.74 parts by mass |
| G-472 (manufactured by Hayashibara Co., Ltd.) | 3.00 parts by mass |

The produced liquid crystal layer composition was added dropwise on the center of one of two sets of the laminates having the spacer layer produced as described above, and sandwiched with the other laminate having the spacer layer. Then, the liquid crystal layer composition was uniformly spread by a roller to obtain a laminate containing the liquid crystal layer composition.

Figure 2:
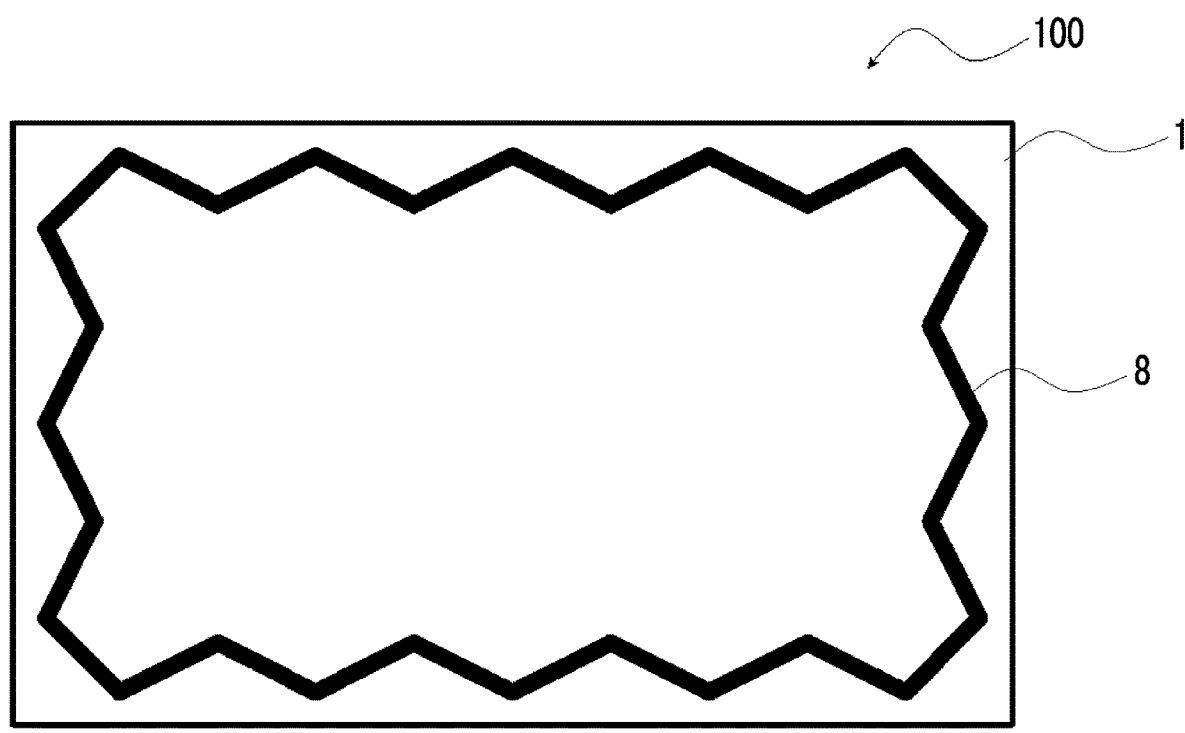
FIG. 2 is a schematic top view showing an example of one embodiment of the plastic cell of the present invention.

Thereafter, to the four sides of the present laminate, a wavy line-shaped heat source (width of 0.2 cm) having a period P of 1.8 cm and an amplitude A of 1.0 cm was applied from above and below the plastic substrate to obtain an oblong plastic cell as shown in FIG. 2, and a sealing part was formed therein by thermal fusion welding at 300° C. for 5 seconds to manufacture a plastic cell 101.

Regarding the plastic cell 101 manufactured as described above, in order to check flexibility thereof, identification was made as to whether there was no problem in the sealing part even in a case of being bent by 90° near the center.

Figure 10A:
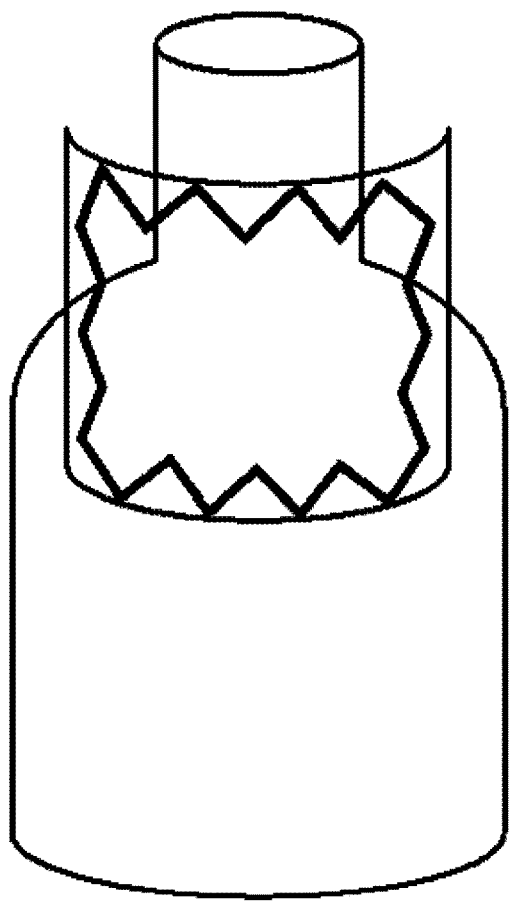
FIG. 10A is a schematic diagram showing a state before molding by heating in a case where the molding by heating is performed to have a curved surface region in the present invention.
Figure 10B:
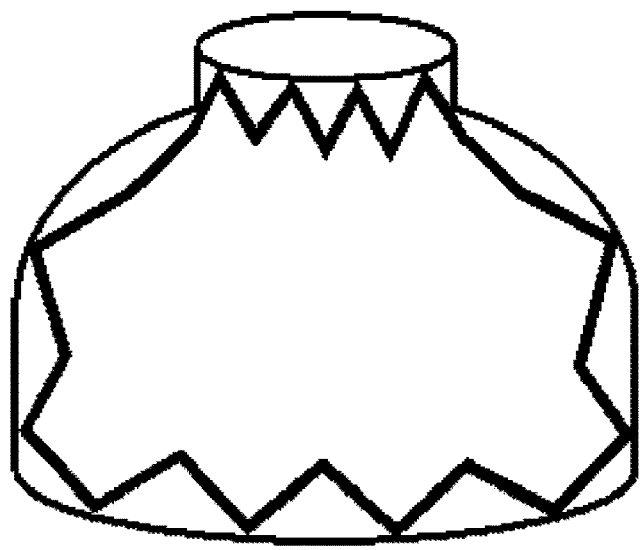
FIG. 10B is a schematic diagram showing a state after molding by heating in a case where the molding by heating is performed to have a curved surface region in the present invention.

Further, using the plastic cell 101 manufactured above, the plastic cell 101 was molded to have a curved surface region by heating it to 150° C. along a curved surface-shape mold as shown in FIG. 10A and keeping such heating so that an upper side portion of the plastic cell 101 was shrunk, and a lower side portion thereof was stretched. In this way, a plastic cell 201 having a curved surface region as shown in FIG. 10B was manufactured.

Regarding the sealing part of the plastic cell 201, in a part where a period of the wavy line shape P becomes a maximum thereof, changes were made to have the period P of 3.2 cm and an amplitude A of 0.6 cm, and in a part where the period P becomes a minimum thereof, changes were made to have the period P of 1.4 cm and the amplitude A of 1.3 cm. All of an upper side, a lower side, and left and right sides of the plastic cell 201 were molded in a form that follows a curved surface.

Comparative Example 1

A plastic cell 102 was manufactured in the same manner as in Example 1, except that in Example 1, to the four sides of the laminate, a wavy line-shaped heat source (width of 0.2 cm) having a period P of 5 cm and an amplitude A of 0.1 cm was applied from above and below the plastic substrate, and a sealing part was formed therein by thermal fusion welding at 300° C. for 5 seconds.

Using the plastic cell 102 manufactured above, as in Example 1, the plastic cell 102 was molded by heating it to 150° C. along a curved surface-shape mold and keeping such heating so that an upper side portion of the plastic cell 102 was shrunk, and a lower side portion thereof was stretched. In this way, a plastic cell 202 having a curved surface region was manufactured. However, in the upper side and the left and right sides of the sealing part of the plastic cell 202, the plastic cell could not follow the mold, so that roughness was generated in a bellows shape and a uniform molding could not be achieved along a curved surface. On the other hand, in the lower side, stretching was carried out along the mold. As a result, the sealing was extended and partially broken, and a liquid crystal composition inside the plastic cell leaked out.

EXPLANATION OF REFERENCES 1, 7: plastic substrate
2, 6: transparent conductive layer
3, 5: orientation layer
4: fluid layer
8: sealing part
100: plastic cell

What is claimed is:

1. A plastic cell comprising:
a first plastic substrate, a first transparent conductive layer, a fluid layer, a second transparent conductive layer, and a second plastic substrate, in this order,
wherein the plastic cell further comprises a sealing part that seals the fluid layer by deformation of a part of the first plastic substrate or the second plastic substrate, and
the sealing part has a region of a wavy line shape that satisfies Expression (1), $$P \leq 40\,A \tag{1}$$

in Expression (1), P represents a distance between adjacent peaks in a period of the wavy line shape, and A represents an amplitude of the wavy line shape.

2. The plastic cell according to claim 1,
wherein both the first plastic substrate and the second plastic substrate are elongated films, and
the plastic cell is in a roll form obtained by winding the elongated films in a longitudinal direction.

3. The plastic cell according to claim 1, having a curved surface region.

4. A method for manufacturing a plastic cell, comprising:
a step of heating the plastic cell according to claims 1 to 100° C. or higher and molding the plastic cell to have a curved surface region.

* * * * *